(12) United States Patent
McMillan et al.

(10) Patent No.: US 6,176,525 B1
(45) Date of Patent: Jan. 23, 2001

(54) THERMOPLASTIC LINER AND A FLANGE ON A TUBULAR MEMBER LINED WITH A THERMOPLASTIC LINER AND A FLANGE LINED TUBULAR MEMBER

(75) Inventors: James S. McMillan, Crowley; Simon Tarsha, Edgecliff, both of TX (US)

(73) Assignee: INA Acquisition Corp., Wilmington, DE (US)

(*) Notice: Under 35 U.S.C. 154(b), the term of this patent shall be extended for 0 days.

(21) Appl. No.: 09/565,081

(22) Filed: May 4, 2000

Related U.S. Application Data

(62) Division of application No. 08/941,974, filed on Oct. 1, 1997, now Pat. No. 6,079,095.

(51) Int. Cl.7 .................................................. F16L 55/00
(52) U.S. Cl. .......................... 285/55; 285/363; 285/908; 285/350; 285/416
(58) Field of Search ................................. 385/908, 55, 48, 385/50, 363, 350, 423, 405, 413, 414, 416

(56) References Cited

U.S. PATENT DOCUMENTS

| | | |
|---|---|---|
| 3,142,868 | 8/1964 | Blout . |
| 3,417,786 * | 12/1968 | Schnabel ................................ 285/55 |
| 3,650,550 * | 3/1972 | West ...................................... 285/55 |
| 4,667,989 | 5/1987 | Bona . |
| 4,901,424 | 2/1990 | Menendez . |
| 5,094,795 | 3/1992 | McMillan et al. . |
| 5,149,142 * | 9/1992 | Walko .................................... 285/55 |
| 5,171,041 | 12/1992 | McMillan et al. . |
| 5,403,533 | 4/1995 | Meier . |
| 5,462,706 | 10/1995 | McMillan et al. . |

FOREIGN PATENT DOCUMENTS

| | | | |
|---|---|---|---|
| 3624117 * | 1/1988 | (DE) ..................................... 285/55 |
| 810400 * | 3/1959 | (GB) ..................................... 285/55 |
| 6042682 * | 2/1994 | (JP) ...................................... 285/55 |

* cited by examiner

*Primary Examiner*—Dave W. Arola
(74) *Attorney, Agent, or Firm*—Cowan, Leibowitz & Latman, P.C.; Michael I. Wolfson; Lloyd G. Buchanan

(57) ABSTRACT

A method for installing a flange on the end of a tubular member lined with a thermoplastic liner is provided. The flange is formed with a groove having extrusion openings extending from the front to the rear surface of the flange, the groove for receiving the reformed end of the liner which is forced into the extrusion openings and extends above the front surface of the flange to provide a surface for securing with a corresponding flange.

7 Claims, 3 Drawing Sheets

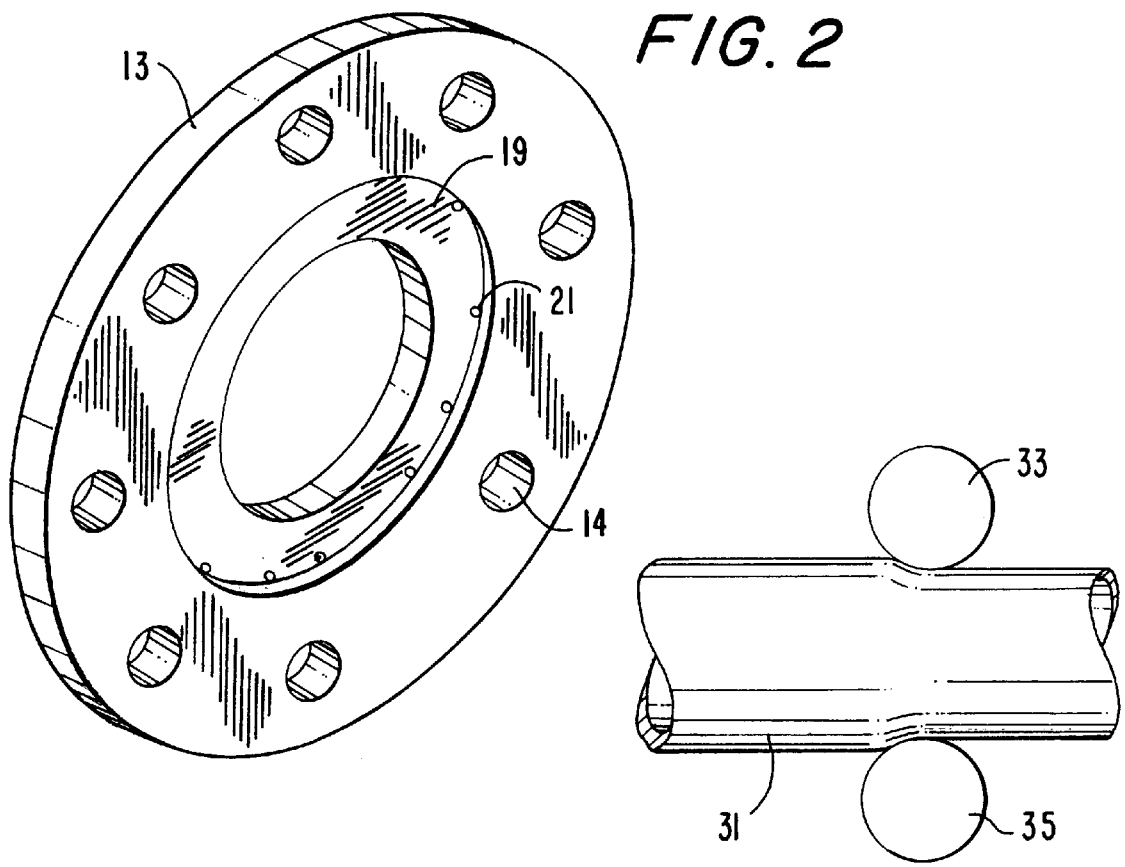
FIG. 2
FIG. 3
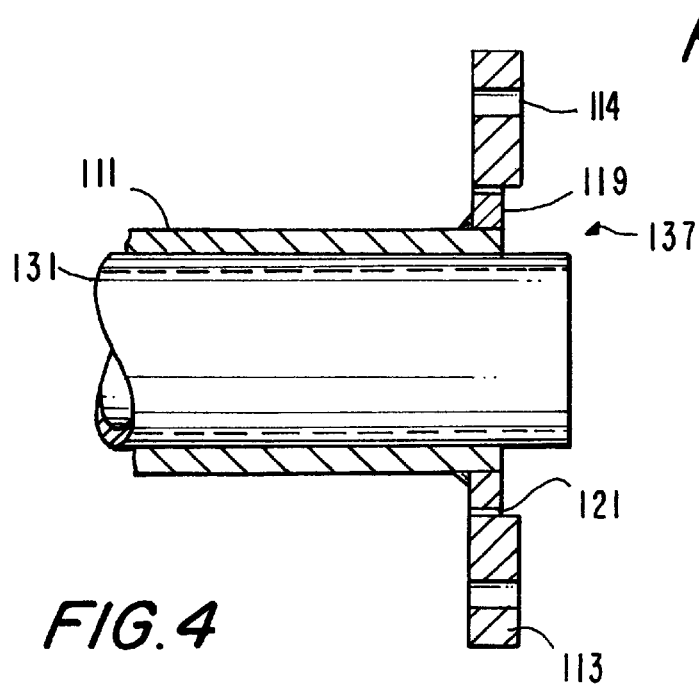
FIG. 4

THERMOPLASTIC LINER AND A FLANGE ON A TUBULAR MEMBER LINED WITH A THERMOPLASTIC LINER AND A FLANGE LINED TUBULAR MEMBER

CROSS-REFERENCE TO RELATED APPLICATIONS

This application is a divisional of application Ser. No. 08/941,974 filed on Oct. 1, 1997 now Pat. No. 6,079,095.

BACKGROUND OF THE INVENTION

This invention relates to a method for installing a flange on the end of a tubular member lined with a thermoplastic liner, a novel flange construction and the lined flanged tubular member.

The lining of tubular members with plastic pipeliners achieves several desirable results. Firstly, such liners are used to repair pipelines which have developed cracks or leaks through which conveyed fluid may be lost. Such liners are also used to protect metal pipelines from internal corrosion resulting from the corrosive nature of the conveyed fluid. In the case of oil field pipe, many of the fluids transported for completion, stimulation or production have a detrimental effect on the metal from which the pipe is constructed.

In addition to use in oil field applications, lined tubular members also find wide application in the irrigation field. In this case, it is desirable to protect the metal pipelines from internal corrosion, and at the same time provide suitable joints so that long sections of tubular members can be flanged together to provide water at far distances from the source.

The plastic pipeliners which are installed within metal tubular members are usually thermoplastic materials. These materials can be heated to a temperature and for a time sufficient to render the material to a malleable state so that the material can be formed into a desired shape. The term "plastic" is intended to include, for example, polyethylene, polyvinyl chloride, polyvinyl chloride-acetate, polystyrene and the like.

In the case of flanged metal pipelines, various adapters have been provided in the past for joining sections of pipelines as well as the associated sections of plastic liners. In one such prior art technique, the adapters were fused onto the plastic liner ends which protrude from the section of metallic pipeline. Since the adapters were of a fixed length, it was necessary to calculate accurately the expansion/contraction characteristics of the plastic liner material installed within the section of metal pipeline to prevent the adapters from being pulled out of position upon contraction of the liner. In other prior art techniques, an exposed portion of the plastic liner was bent backwards at an angle or "flare" to form-a-flange on a plastic liner. U.S. Pat. No. 3,142,868 to Blout, issued Aug. 4, 1964 is typical of this type of prior art approach. Here, a mechanical device is utilized to flare a liner extending from a tubular member. The process also involves heating, supporting and cooling the flared end.

The inventors have also developed reinforced flanges on plastic pipeliners suitable for use in high pressure applications. A reinforced flange is disclosed in U.S. Pat. No. 5,094,795 issued on Mar. 10, 1992 and U.S. Pat. No. 5,171,041 issued on Dec. 15, 1992 to McMillan and Tarsha. In this prior art device, a reinforced ring having a rigid portion and an elastomeric portion is placed about the liner exterior and a retaining ring is placed about the reinforced disk. A forming unit is used to apply heat to the liner and force it to flip into a reformed shape having a greater external diameter than the remainder of the liner. While this method is entirely satisfactory, it is desirable to provide a more economical approach for use in irrigation systems.

The inventors herein have also disclosed a method for forming a flange on the end of a plastic pipeliner utilizing a preformed synthetic disk installed on the end of the liner which extends from the tubular member. The exposed end is surrounded with a heating unit which heats the junction between the preformed disk and exposed end of the liner to form a weld area between the two elements. This method is also entirely satisfactory, but requires a wide variety of preformed disk having a variety of accurately formed central bores for placement on the extended portion of the liner. This method of forming a flange is disclosed in U.S. Pat. No. 5,462,706 for "Method for Forming a Flange on an End of a Synthetic Liner" which issued on Oct. 31, 1995, to McMillan and Tarsha.

The early prior art techniques such as Blout suffers from the shortcoming that the liner flange end could be drawn longitudinally inwardly into the interior of the tubular member upon contraction of the liner material. Other prior art liners are designed to overcome this shortcoming, but it nevertheless remains desirable to provide an improved method for forming a liner when a blow out protection ring is not needed and it is desirable not to have to couple two separate elements to form a flange.

SUMMARY OF THE INVENTION

A method of forming a flange on a steel pipe and lining the pipe and a portion of the face of the flange is provided. A steel flange dimensioned to be welded to the outside of the steel pipe is formed with a machined annulus on the inner side of the outer surface of the flange and a plurality of extrusion holes are formed from the annulus through the back surface of the flange. The flange is also formed with a plurality of bolt openings for engaging with a corresponding flange on a lined pipeline to be joined thereto.

The reinforced flange is welded to the end of the steel pipe which is then lined with a synthetic liner by a known lining technique, such as for example diameter reduction, with at least one end of which liner extending outwardly from the end of the flanged end of the steel pipe. Preferably, the synthetic liner is rolled to a reduced external diameter prior to insertion within the tubular member and is allowed to expand to its original outside diameter to secure the liner within the tubular member prior to forming the flange.

The liner is then trimmed to an appropriate distance from the end of the flange and a heating unit in the form of a metallic cylinder with an outer blade-like portion and an inner heating unit is inserted into the liner. The heat is preferably provided to the heating unit by means of an electric resistance heating element in the form of a metallic cylinder having an outer blade-like portion. The blade-like portion is inserted between the surface formed by the internal lip of the flange disc and the surface formed by the exterior of the exposed end of the synthetic liner in order to form the molten weld area between the liner and disc. After heating, a forming mandrel and outer form are bolted to the flange and the mandrel is driven into the liner to force the excess liner into the machined annulus with the excess liner material driven through and out the extrusion holes in the rear surface of the steel flange.

The reformed liner is dimensioned to provide a flat surface parallel to the outer flange surface and protrude a sufficient distance beyond the outer surface of the flange to provide a coupling surface for a corresponding flange liner bolted to the flange. Typically, the reformed liner extends between 1/16 and 1/8 inch beyond the outer surface of the flange.

Accordingly, it is an object of the invention to provide an improved method for forming a flange and lining a metallic pipe.

It is another object of the invention to provide a lined flange steel pipe suitable to provide flanged thermoplastic surfaces of simplified construction.

It is a further object of the invention to provide an improved simplified lined metallic pipe by providing a metallic flange having an annular recess upon the outer surface of the flange and a plurality of extrusion openings extending to the rear surface of the flange for receiving excess material upon reforming the liner material.

Still other objects and advantages of the invention will in part be obvious and will in part be apparent from the specification.

The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is made to the following description when read in connection with the accompanying drawings in which:

FIG. 2 is a perspective view of a metallic flange to be welded to the steel pipe to be lined and flange;

FIG. 3 is a simplified view of the diameter reduction step for reducing the diameter of the liner prior to installation;

FIG. 4 is a simplified sectional view of the lined metallic pipe prior to completion of the flanging step;

DESCRIPTION OF THE PREFERRED EMBODIMENT

Figure 1:
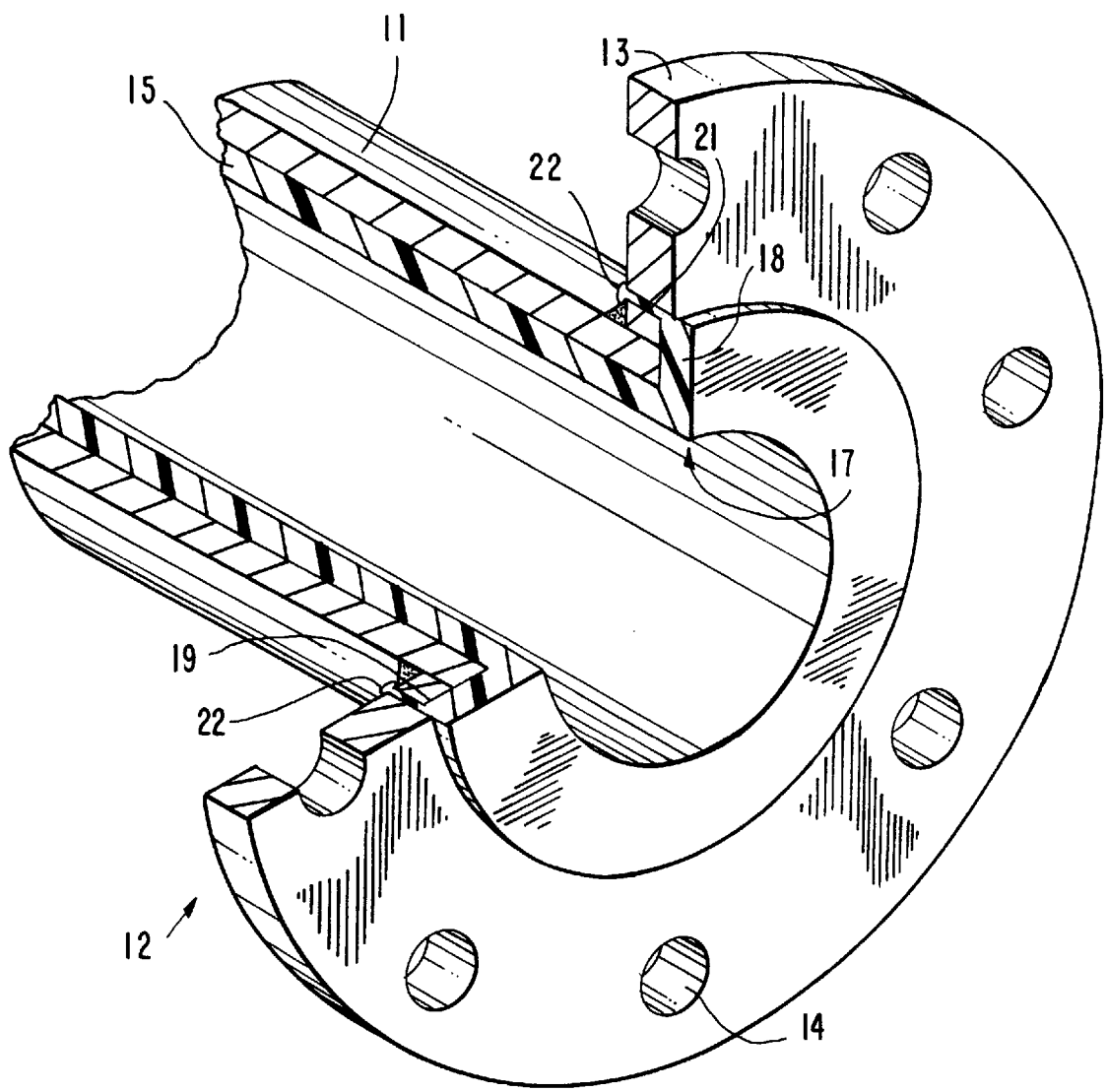
FIG. 1 is a partial cut-away perspective view showing the lined flange metallic pipe constructed and arranged in accordance with the invention.

FIG. 1 shows a cut-away perspective view of a tubular member 11, in this case steel pipe, with a flanged end 12 having a flange 13 and lined with a synthetic liner 31 having a flange 18 formed thereon according to the present invention. Tubular member 11 can serve any of a number of purposes. For example, tubular member 11 could be a metallic pipeline of the type used in oil and gas industries, a fluid conduit for conveying chemicals or corrosive liquids, or a water or natural gas conduit. In any case, flange 13 extends generally perpendicular to the longitudinal axis of tubular member 11 and is usually provided with a plurality of bolt holes 14 for forming a connection with the next successive joint of pipe. Flange 13 is also formed with a grooved portion 19 on the interior of the surface of flange 13 and adjacent to tubular member 11. A plurality of circumferentially spaced extrusion holes 21 extend through flange 13 in grooved portion 19.

FIG. 2 shows metallic flange 13 in isolation with annular groove 19 and extrusion holes 21. Metallic flange 13 also has a plurality of circumferentially spaced bolt holes 14 for coupling to an adjacent liner or fitting.

In order to form liner flange 18, a plastic pipe liner 31, as in FIG. 3, is first installed within metal pipeline 11. This can be accomplished in a number of ways, including stretching and inserting liner 31, diameter reduction, chemically bonding the liner, or any method providing a tight fit of liner 31 against the interior of pipeline 11. FIG. 3 shows a plastic pipe liner 31 as it is being downsized by passing through a series of downsizing rollers 33,35. Prior to recovering its original dimensions, liner 31 is installed within a section of existing pipeline to be lined, such as metallic pipeline 11. The material of liner 31 is preferably one of the conventionally known thermoplastic type materials, such as polyethylene, polypropylene and the like.

FIG. 4 shows a liner 131 installed within a tubular member 111 which, in this case, is a metallic pipeline having a flanged end 113 which is typically joined to tubular member 111 at a weld line (not shown). At least one opposite end 137 of plastic pipe liner 131 extends outwardly of pipeline 111 and is exposed from flanged end 113. Typically, both ends are exposed and flanges can be formed on both ends. Flanged end 113 of tubular member 111 has a plurality of circumferentially spaced, bolt-engaging which holes 114. Flanged end 113 also has an annular groove 119 adjacent tubular member 111 with a plurality of circumferentially spaced extrusion holes 121.

In order to install a flange on synthetic liner 111, exposed end 137 of plastic pipe liner 111 is first trimmed, leaving a predetermined length, for example 1" in FIG. 4. Liner end 137 is then heated for a time and to a temperature sufficient to render the elastomeric material to a reformable condition. In the case of thermoplastic pipes, such as those made from polyethylene, it is desirable to heat the material above about 300° F., in order to heat exposed liner end 137 above about 250° F. This renders the plastic material "malleable" allowing it not only to bend, but to flow and be reformed into the desired shape.

Figure 5:
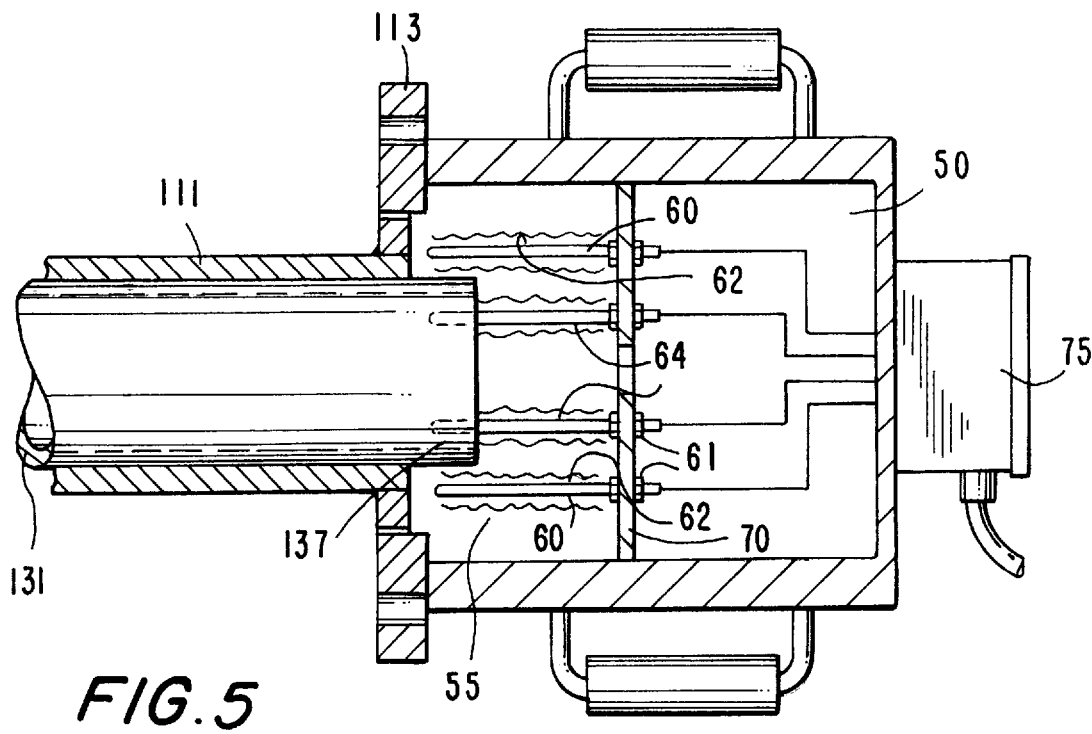
FIG. 5 is a simplified sectional view of the heating unit used to heat the exposed liner when practicing the method in accordance with the invention.

The heating step can be accomplished in various ways. In a preferred embodiment of the invention shown in FIG. 5, a heating unit 50 having an open interior 55 is positioned next to flanged end 113. Heating unit 50 is provided with a plurality of internal heating elements such as electric, tubular heater elements 60. Heater elements 60 are available from a variety of commercial sources and are formed, e.g. from compressed ceramic in stainless steel jackets. A plurality of heater elements 60 are arranged circumferentially about liner end 137 within heating unit 50 to provide sufficient heat to heating unit 50 to elevate the temperature of the liner material above the temperature to make the liner material malleable. In the case of a polyethylene liner, this may be approximately 250° F. Preferably, heating unit 50 has two heating sections formed by the circumferentially arranged plurality of heating elements —an outer portion 62 and an inner portion 64. Both portions generally form circumferences with one end of each portion remaining open for engaging liner end 137 to allow heating. Heating unit 50 is positioned so that portions 62,64 of heater element 60 surround liner end 137 with liner end 137 being between heating portions 62 and 64 as shown in FIG. 5. Heater elements 60, in the embodiment shown, are mounted in holes 61 provided in a support plate 70 and are powered by a conventional electric power source 75. Suitable heating elements are commercially available from Watlow Electric Manufacturing Company of St. Louis, Mo.

Figure 6:
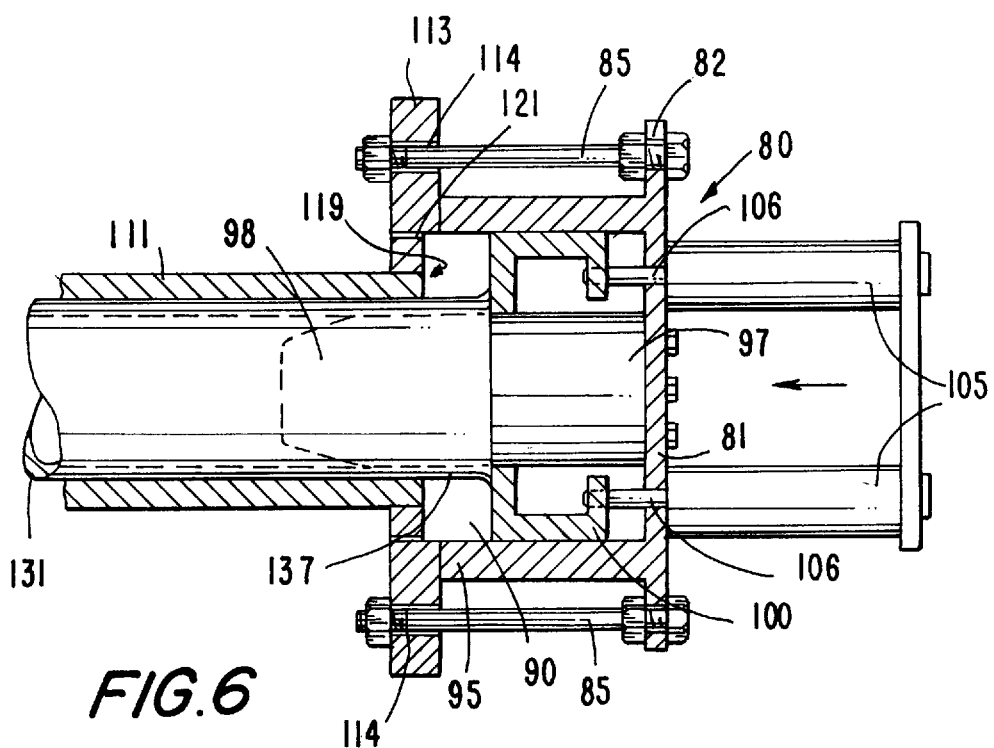
FIG. 6 is a side, sectional view of the forming unit during the step of forming the liner flange in accordance with the invention.

As shown in FIG. 6, a forming unit 80 is then placed about exposed end 137 of plastic pipe liner 131. Forming unit 80 includes a body 81 with openings 82 for engaging flange 113 of tubular member 111 by a suitable engagement means such as a plurality of engagement bolts 85. Forming unit 80 has an internal recess provided by, e.g. the circumferential collar 95 which surrounds exposed end 137 of plastic pipe liner 131. Collar 95 forms a circumferential recess 90 in the interior of forming unit 80. An internal mandrel 97 extends within collar recess 90 and has an inner extent 98 which is adapted to be received within the interior of plastic pipe liner 131 for maintaining the internal diameter of liner 131 during the forming operation.

A drive element, including a compression ring or forming collar 100 is located between internal mandrel 97 and the interior of collar 95 for contacting the plastic pipe liner exposed end 137 to form the liner end outwardly into the circumferential recess 90. The drive element used to displace compression ring or forming collar 100 in the direction of exposed end 137 of plastic pipe liner 131 can include a plurality of hydraulic cylinders 105 mounted on body 81 of forming unit 80 and having output shafts 106 which are engaged with compression ring or forming collar 100 to move compression ring or forming collar 100 longitudinally with respect to forming unit 80 and form liner end 137 outwardly into circumferential recess 90 provided in the collar of the forming unit 80. Preferably, hydraulic cylinders 105 are capable of applying about 900–1000 psi pressure on the exposed liner end. Note that liner exposed end 137 is not being "flared", but rather is being flowed and reformed to the desired shape.

With reference to FIG. 1, it will be appreciated that liner exposed end 37 (137 in FIG. 4) has been moved or "reformed" to a greater outside diameter as flange 18. The action of compression ring or forming collar 100 on the malleable material is to force the material into a reformed mass, rather than flaring exposed end through an angle about pipe flange 13. It will be appreciated that a portion 22 of liner end 37 in FIG. 1 has, in fact, extruded into and through extrusion holes 21 provided in groove portion 19 of flange 13 of tubular member 11. Annular groove 19 is sized and the length of liner extending from tubular member 11 prior to reforming is selected so that reformed liner flange 18 extends beyond the outer surface of the metallic flange 13. Reformed liner flange 18 is dimensioned to protrude a sufficient distance beyond the outer surface of metallic flange 13 to provide a coupling surface for a corresponding liner flange to be bolted to metallic pipe flange 13. Typically, reformed liner flange 18 extends between 1/16 and 1/8 inch beyond the outer surface of metallic pipe flange 13.

The invention described has several advantages. The flange fitting shown in FIG. 2 differs significantly from the prior art arrangements in which the exposed liner end was either flared back at an angle over the pipe flange or in which the end was elastically stretched outward, clamped and butt fused to a preformed end cap. The flange has an annular groove to receive the reformed liner end which extends into the extrusion holes which act as reinforcement to prevent the liner end from being retracted within the pipe interior when the liner contracts during recovery.

It will be seen that the objects set forth above, among those made apparent from the preceding description, are efficiently attained and, since certain changes may be made in carrying out the method and in the apparatus set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features herein and described and all statements of the scope of the invention which, as a matter of language, might be said to fall therebetween.

What is claimed is:

1. A flange for a tubular member with at least one end having an installed plastic pipe liner therein with the at least one end of the liner extending at least partly from the tubular member, the improved flange comprising:

a disk-shaped member having an outer surface and an opposed rear surface, said member having a central bore and being dimensioned to fit one end of the tubular member;

an internal annular groove in the outer surface; and a plurality of extrusion holes in the annular groove.

2. The flange of claim 1, wherein the plurality of extrusion holes extend from the annular surface through to the rear surface.

3. The flange of claim 1, wherein the disk-shaped member is provided with a multiplicity of bolt holes extending from the outer surface to the rear surface.

4. A metallic pipe comprising a tubular member with opposite ends and a metallic flange installed on at least one end of said tubular member, the flange having an outer surface and opposed rear surface, the flange formed with an internal annular groove on the outer surface and a plurality of extrusion openings extending from the groove to the rear surface of the flange.

5. The metallic pipe of claim 4 wherein the said metallic flange is provided with a multiplicity of bolt holes extending through from the outer surface to the rear surface thereof.

6. An improved lined tubular member comprising a metallic tubular member having opposite ends and having a flange on at least one end thereof, comprising a disk-shaped member with an outer surface and an opposed rear surface, said member having a central bore and being dimensioned to fit the one end of the tubular member and having an internal annular groove in the outer surface, and a plurality of extrusion holes in the annular groove; and having a thermoplastic liner installed in the metallic tubular member with one end of the liner extending outwardly from the flange end of the metallic tubular member.

7. A metallic pipe having a thermoplastic liner installed therein and at least one end having a flange, comprising:

a disk-shaped tubular member with an outer surface and an opposed rear surface, said member having a central bore and being dimensioned to fit one end of the tubular member and an internal annular groove in the outer surface, and a plurality of extrusion holes in the annular groove; and a portion of the plastic liner which has been formed with sufficient force to flow the liner into the annular groove and force excess liner material through the extrusion openings and to provide a portion of the reformed liner extending outwardly from the front surface of the flange to provide a compressive surface for meeting with a corresponding lined flange steel pipe to be connected therewith.

* * * * *